United States Patent

[11] 3,608,010

| [72] | Inventor | Vance Allen Stayner<br>Wauconda, Ill. |
|---|---|---|
| [21] | Appl. No. | 700,212 |
| [22] | Filed | Jan. 24, 1968 |
| [45] | Patented | Sept. 21, 1971 |
| [73] | Assignee | Federal-Huber Co.<br>Chicago, Ill. |

[54] METHOD OF FORMING A LIGHTWEIGHT STRUCTURAL ASSEMBLY BY JOINING ACRYLIC RESIN BALLS WITH A POLYESTER OR EPOXY RESIN MATRIX
5 Claims, 3 Drawing Figs.

[52] U.S. Cl.................................................. 264/51,
161/DIG. 5, 260/2.5 B, 264/41, 264/122, 264/128,
264/DIG. 6, 264/DIG. 63
[51] Int. Cl.................................................. B29d 27/00
[50] Field of Search........................................... 264/53, 45,
96, 128, 122; 260/2.5 B; 161/DIG. 5; 156/165

[56] References Cited
UNITED STATES PATENTS

| 3,325,341 | 6/1967 | Shannon | 264/48 X |
| 3,477,967 | 11/1969 | Resnick | 260/2.5 B UX |
| 3,503,825 | 3/1970 | Moore | 264/45 X |
| 2,797,201 | 6/1957 | Veatch | 264/53 X |
| 2,806,509 | 9/1957 | Bozzacco | 264/45 UX |
| 2,929,106 | 3/1960 | Snow | 264/96 X |
| 2,985,411 | 5/1961 | Madden | 161/DIG. 5 |
| 3,021,573 | 2/1962 | Bentov | 264/128 X |
| 3,193,440 | 7/1965 | Schafer | 264/128 X |
| 3,207,587 | 9/1965 | Fulk | 264/128 X |
| 3,379,799 | 4/1968 | Goldman | 260/2.5 B X |
| 2,541,249 | 2/1951 | Hobson | 264/96 |

*Primary Examiner*—Donald J. Arnold
*Assistant Examiner*—Paul A. Leipold
*Attorney*—Hill, Sherman, Meroni, Gross & Simpson ABSTRACT: Method of forming a lightweight structural assembly of high structural strength comprising, in combination, a hollow member, a filler therein of hollow plastic balls and a resinous matrix therefor of a resin selected from the group consisting of epoxy and polyester resins. The method of making the assembly uses the hollow member as the mold and effects the formation and curing of the matrix resin by the exothermic reaction between the resin-forming components, thereby liberating sufficient heat to cause the plastic balls to expand and subsequently upon cooling to exhibit a stressed state than increases the structural strength of the resulting assembly. The hollow member is preferably formed of a lightweight rigid material, such as aluminum, an aluminum or magnesium alloy, or a resin, and the balls are preferably formed with thin continuous spherical walls of a polymethylmethacrylate or polymethacrylate with diameters varying from one-half to 1¾ inches. The balls are coated with a tacky polyester or epoxy resin prior to charging the balls into the cavity to cause the balls to become attached to one another and relatively fixed in place prior to introducing the liquid resin matrix.

PATENTED SEP 21 1971 3,608,010

INVENTOR.
VANCE A. STAYNER

BY Hill, Sherman, Meroni, Gross & Simpson ATTORNEYS

METHOD OF FORMING A LIGHTWEIGHT STRUCTURAL ASSEMBLY BY JOINING ACRYLIC RESIN BALLS WITH A POLYESTER OR EPOXY RESIN MATRIX

SUMMARY OF THE INVENTION

In accordance with the present invention, a lightweight, high structural strength structural assembly is produced by a method that employs, as a confining mold, a lightweight hollow structural member, and introduces into said hollow member, hollow plastic balls and a resin-forming composition that forms, by an exothermic reaction, a resinous matrix substantially filling the interstices between said hollow balls, and between said hollow balls and the confining wall of the mold-forming structural member, thereby embedding said hollow balls in said resin matrix and providing a lightweight filler for the hollow-structural member.

The hollow balls are preferably thin-walled spheres formed of an acrylic resin, such as polymethylmethacrylate, the diameter of the balls being, in general, between about 1½ and 1 ¾ inches, or greater. The resin of the matrix is one selected from the group consisting of epoxy and polyester resins, and is formed in situ in the hollow structural member by the reaction between a curing agent and a component, or components, capable of forming the selected resin and of effecting a curing thereof. The heat liberated by the exothermic reaction is sufficient not only to form and cure the resin in situ, without the addition of external heat, but is also sufficient to cause the hollow plastic balls to expand into effective and extended surface contact with the resinous matrix and also cause the resin matrix to be forced into effective and extended surface contact with the inner wall of the confining hollow structural member. As the resulting assembly cools to circumambient air temperatures, the plastic balls contract from their expanded state and in the course of their contraction become stressed.

I have found that this resultant stressing of the individual hollow plastic balls greatly enhances the structural strength of the final assembly over and beyond the strength that would be obtained in the absence of such stressing of the walls of the balls. Also, by using hollow plastic balls of relatively large diameter within the range above specified, and especially by varying the sizes of the hollow plastic balls in accordance with the cross section of the hollow structural member that serves to confine the matrix-embedded balls, it is possible to obtain in the final structural assembly practically any degree of structural strength and of low overall density that may be desirable for the purpose or use to which the final structural assembly is to be put. Such uses include utility poles, such as telephone poles, brackets therefor, and many other uses that are now being served by structural elements and assemblies made of conventional materials that require relatively high specific density in the ultimate structural assembly in order to obtain the requisite structural strength.

DETAILED DESCRIPTION OF THE DRAWINGS

Figure 1:
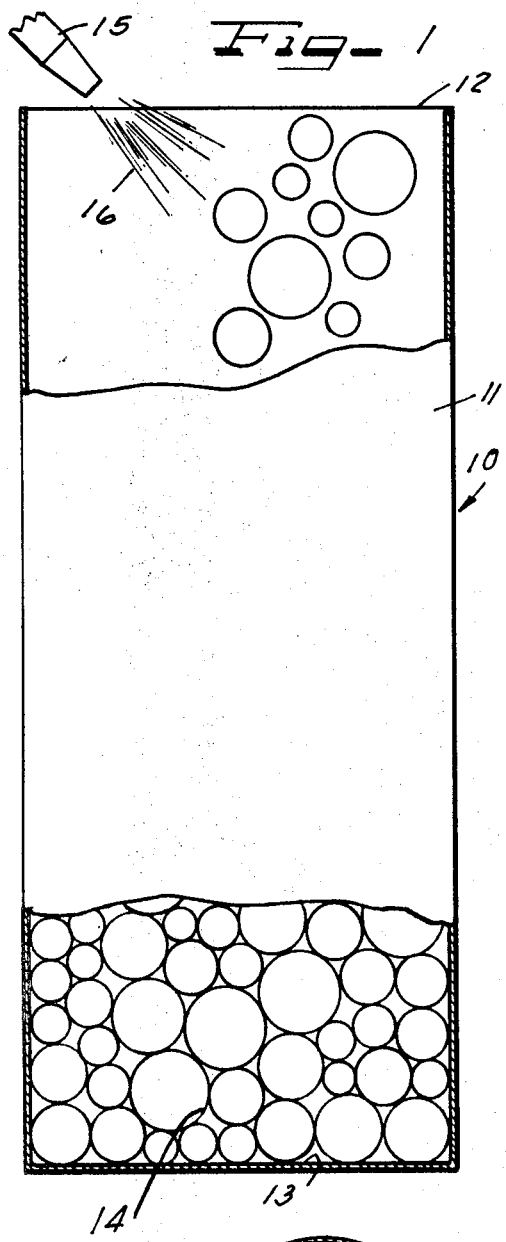
FIG. 1 is a some what diagrammatic elevational view, with parts broken away, to illustrate the step in my method of charging hollow plastic balls into a confining structural member, such as a tube or cylinder that serves as the mold in a subsequent step.
Figure 2:
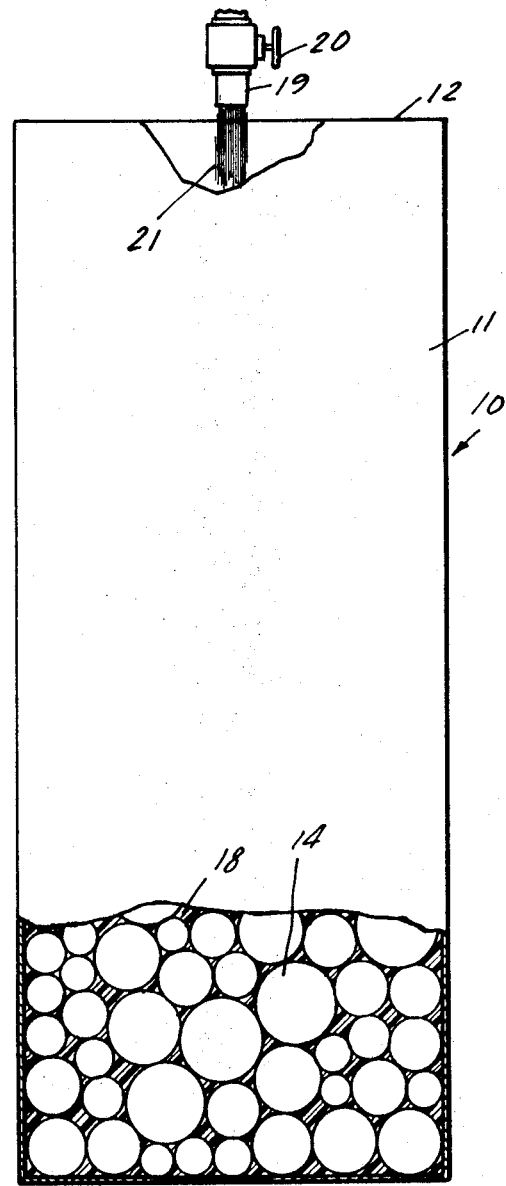
FIG. 2 is a similar diagrammatic elevational view illustrating the subsequent step of charging into the hollow structural member, as a mold, a flowable resin-forming composition capable of reacting to form an embedding and surrounding matrix for the plastic balls.

FIGS. 1 and 2 of the drawing, the reference numeral 10 indicates generally a hollow structural member, here shown in the form of a cylinder or tube having a cylindrical wall 11 of any suitable material, such as a lightweight metal or alloy of aluminum or of magnesium, or formed of a synthetic thermoset resin having a desired rigidity and structural strength, and for some purposes, having the desired dielectric strength. Phenol formaldehyde, high-density urethane and other cross-linked resins can be used as the situation may demand. The structural member 10 is open at its top, as at 12, and is provided at its other end with a closure 13. In some instances it may be desirable to use a tube of considerable length as the structural member and to close the one end of the tube by a temporary plug to serve as the closure 13, or that end of the structural member may be provided with an integral wall serving as the closure. If a temporary plug is used, it may be formed of a disc of heavy paperboard, fiberboard, or the like and forced into that end of the hollow member that is to be provided with a closure 13. If a temporary plug is used, it cam be removed from the final assembly before use thereof.

Figure 3:
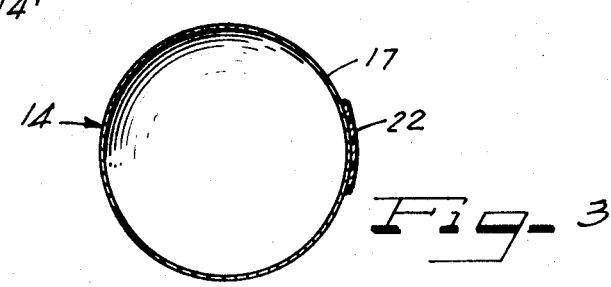
FIG. 3 is a cross-sectional view of a hollow-plastic ball to illustrate the relative thinness of the spherical walls thereof.

The reference numeral 14 indicates a hollow plastic ball, which, as shown, may be provided in various sizes, but for my purposes the hollow balls 14 are generally spherical and of a size within a diameter of from about 1½ to 1 ¾ inches. As best shown in FIG. 3, each such ball 14 has a relatively thin wall 17 in comparison to its diameter, the wall thickness varying in general between about 0.007 and 0.02 inches, although wall thicknesses outside of this range may be used for certain purposes. Resins that are suitable for use in making the balls 14 are the acrylic-type resins, preferably polymethylmethacrylates available as Lucite 147, a proprietary product of du Pont; and an acrylic modified styrene, available from Richardson Polymers, a division of The Richardson Company, under the proprietary designations, R–570 and NAS. Richardson R–570 is said to be a copolymer of styrene and methylmethacrylate while Richardson NAS is a water-clear copolymer of higher impact strength and higher elongation than R–570 but not light-stabilized, as in the case of R–570. These and other similar acrylic resins or modified acrylic resins can be formed into thin-walled hollow spheres by blow molding or other conventional type of molding at temperatures in the neighborhood of from 180° to 220° F. For some purposes it is desirable to fill the hollow plastic balls with a nonflammable gas, such as nitrogen, carbon dioxide, or the like and this can be done in accordance with known methods. Depending upon the size and the wall thickness, the hollow plastic balls useful in the method of my invention will weigh between about 4 and 6 grams each.

In carrying out the step illustrated by FIG. 1, the hollow balls 14 are preferably coated as the balls are charged into the upper open end of the hollow structural member 10. As illustrated, coating of the balls 14 is accomplished by spraying the coating material through a spray nozzle 15 that directs a spray 16 against the balls 14 as they fall into the hollow member 10. The coating material may suitably be any sprayable composition that upon loss of any volatile constituents leaves a tacky resinous coating, indicated by the reference numeral 22 (FIG. 3) on the balls 14. Preferably, a coating composition is used that comprises a tacky form of the same resin that is selected from the group consisting of epoxy and polyester resins for constituting the resinous matrix, indicated at 18 (FIG. 2).

The purpose of coating the balls 14 with a tacky composition or resin is to insure that the coated balls will stick together sufficiently so as not to "float" or move upwardly, as the resin forming composition that provides the matrix 18 is being charged into the structural member 10. Instead of applying the coating material simultaneously with the charging of the hollow plastic balls into the structural member 10, the coating material may be previously applied in a separate operation, and the resulting precoated hollow plastic balls then charged into the mold-forming member 10. It is generally simpler and more economical, however, to effect the coating by spraying the balls as they are charged into and fall down to the bottom of the mold-forming member 10 against the closure 13. The amount of coating applied, as well as the extent to which the balls are coated, is not critical as long as the amount is sufficient to cause the balls to stick together and to the inner surface 11 and thereby prevent floating of the balls, due to their buoyancy, in the next step that is illustrated in FIG. 2.

As shown in FIG. 2, a valve controlled assembly including a discharge spout 19 and valve 20 is employed to charge into the mold-forming member 10 and liquid, resin-forming composition from a source of supply (not shown). The liquid, resin-forming composition is discharged downwardly in a stream, indicated by the reference numeral 21 through the open end 12 of the member 10. The charging is continued until the member 10 is substantially completely filled, or filled to the desired height by the hollow balls 14 and the matrix 18 that is formed of the selected resin by reaction of the resin-forming components of the selected composition discharged through the valve and spout assembly, 20, 19.

Where the selected resin is an epoxy resin, the liquid, resin-forming composition will include a polyamine curing agent, such as triethylene tetramine, or the like, and an epoxy resin-forming component such as bisphenol A, with or without a hardener. An epoxy resin-forming composition is available from the Reichold Chemicals, Inc., under the proprietary designation Epotuf resins, and the curing agent and/or catalyst under the designation 37–620 or 37–622 Epotuf Hardener. The Epotuf epoxies are thermosetting resins, which, on addition of a hardener, polymerize to form an infusible solid, having physical properties depending upon the resin and hardener selected. The choice of the hardener, as well as resin, controls the final physical properties of the cured material and also determines whether curing is carried out at ambient or elevated temperature. Preferably, a combination of resin and hardener, or curing agent, is selected that cures at ambient temperatures, that is, without the addition of heat from an external source.

Self curing of the epoxy resin-forming composition charged into the hollow member 10 is effected by reason of the exothermic reaction that takes place on completion of the charging step and upon allowing the resin-forming composition to stand for such time as may be necessary to effect the desired amount of curing. In general, the resin sets up to a gel, or thick, viscous liquid, within 20 or 25 minutes as a result of the exothermic reaction that takes place, but is not fully cured until it has stood about 24 hours. It is as a result of the heat liberated by such exothermic reaction that the balls 14 are caused to expand and thereby exert sufficient outwardly radial pressure to increase the effective surface contact between the balls and the surrounding resinous matrix 18, and also to increase the effectiveness of the direct surface contact between the matrix 18 and the inner wall 11 of the mold-forming container 10. As the filled or partially filled, mold-forming member 10 cools, the balls 14 also cool and consequently tend to shrink, but due to the similar coefficients of expansion of the acrylic type resin of the balls and the epoxy or polyester resin the matrix 18, there is no appreciable separation of the previously contacting surfaces of the balls and the resinous matrix. There is, however, a sufficient shrinkage of the balls 14 upon cooling to set up stresses that greatly enhance the structural strength of the final assembly over the structural strength that would be obtained were this stressing of the walls of the balls 14 not obtained.

If a polyester-forming composition is used to provide the resinous matrix 18, various liquid forms of polyester-forming compositions can be used, including a proprietary product of Reichold Chemicals, Inc., designated as Polylite, preferably 93–062 Polylite or other specific forms of polylite, comprising a polyester-forming liquid and a catalyst, such as MEK peroxide. Usually, I find it most satisfactory to start with Reichold's proprietary product 32–033 and add to 1 percent by weight of MEK peroxide as the catalyst. As in the case of the epoxy type resin, the polyester-forming composition that is fed into the mold-forming structural member 10 is in flowable state as charged, and is self-curing at ambient air temperatures to form a solid resinous matrix, such as the matrix 18, that embeds and surrounds the hollow plastic balls 14. Also, as described in connection with the use of an epoxy resin-forming composition an exothermic reaction takes place that beings about the same results as are obtained with an epoxy resin-forming composition.

Where the term "curing agent" is used in the claims, it will be understood that this term includes a hardener, catalyst or other compound that assists, or facilitates, or effects the self-curing of the resin that is selected for the resinous matrix. Also, while proprietary products of The Richardson Company, du Pont and Reichold have been referred to specifically herein, other epoxy or polyester-forming compositions can be used, including other curing agents than those mentioned, all within the choice of those ordinarily skilled in this art.

It will be understood that modifications and variations may be effected without departing from the scope of the novel concepts of the present invention.

I claim:
1. In a method of producing high-strength, lightweight structural assemblies, the steps of
coating acrylic resin balls having a composition selected from the groups consisting of polymethacrylate and polymethylmethacrylate and having a diameter of about ½ inch to 1 ¾ inch and wall thickness of about 0.007 to 0.2 inch with a tacky resin composition, selected from the group consisting of polyester and epoxy resin compositions,
charging said balls into a cavity to substantially fill the same and to become attached through said tacky resin composition to one another and to the surface of said cavity so as to become relatively fixed in place within said cavity with interstices therebetween,
introducing a liquid mixture of an unreacted resin-forming composition selected from the group consisting of polyester and epoxy resin-forming compositions and a curing agent into said structural member to fill said interstices and become bonded to said coated balls and to said cavity surface,
said resin-forming composition being compatible with said coating composition and being self-curing in situ without the application of external heat or pressure to engender an exothermic reaction forming a resin selected from the group consisting of epoxy and polyester resins,
the heat of said exothermic reaction being alone sufficient to expand said balls,
whereby upon subsequent cooling said balls are left bonded together in a stressed state thereby enhancing the structural strength of the resulting assembly.
2. The method as defined by claim 1, wherein said balls are gas-filled.
3. The method as defined by claim 1, wherein the cavity is cylindrical and is initially open at both ends, and the lower end is closed with a temporary plug during the charging step.
4. The method as defined by claim 3, wherein the cavity is a lightweight tube, and said temporary plug is removed after reaction is effected.
5. The method as defined by claim 2, wherein said balls are filled with a nonflammable gas.